M. H. GEARTTS.
ATTACHMENT FOR FLOUR SIFTERS.
APPLICATION FILED APR. 3, 1915.

1,190,282.

Patented July 11, 1916.
2 SHEETS—SHEET 1.

Witnesses

Inventor
M. H. Geartts,

Attorney

M. H. GEARTTS.
ATTACHMENT FOR FLOUR SIFTERS.
APPLICATION FILED APR. 3, 1915.

1,190,282.

Patented July 11, 1916.
2 SHEETS—SHEET 2.

Witnesses

Inventor
M. H. Geartts.

By
Attorney

UNITED STATES PATENT OFFICE.

MAE H. GEARTTS, OF MARINETTE, WISCONSIN.

ATTACHMENT FOR FLOUR-SIFTERS.

1,190,282. Specification of Letters Patent. Patented July 11, 1916.

Application filed April 3, 1915. Serial No. 18,982.

*To all whom it may concern:*

Be it known that I, MAE H. GEARTTS, a citizen of the United States, residing at Marinette, in the county of Marinette and State of Wisconsin, have invented certain new and useful Improvements in Attachments for Flour-Sifters; and I do hereby declare the following to be a full, clear, and exact description of the invention, such as will enable others skilled in the art to which it appertains to make and use the same.

This invention relates to new and useful improvements in attachments for flour sifters, and has for its principal object to provide a device which will effect a material saving in flour.

Another object of the invention is to provide a device forming a cover for the bottom of flour sifters and the like which prevents the spilling of the flour when the sifter is transported.

A further object of the invention is to provide a novel means for holding the cover in engagement with the bottom of the sifter which may be readily released, thus permitting the contents of the sifter to be easily and quickly distributed at the desired time.

Still another object of the invention is to provide a means for easily releasing the cover or bottom which is operated by gripping the handle more tightly, and which is operated from the handle of the sifter, thus avoiding the necessity of using more than one hand to control the operation of the device.

Figure 1:
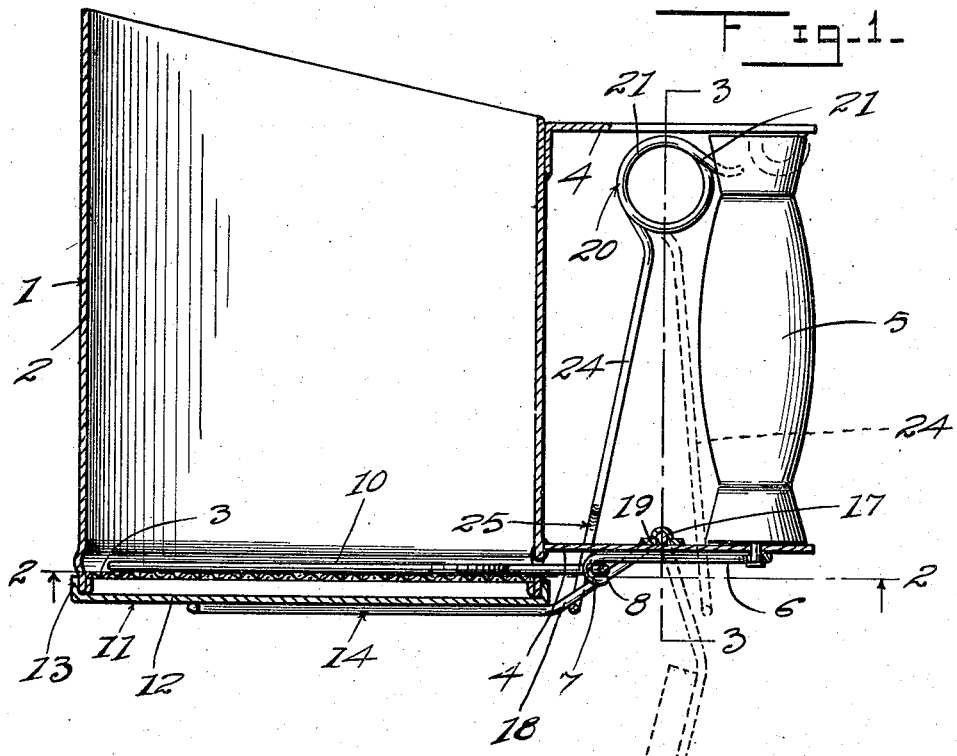
Figure 4:
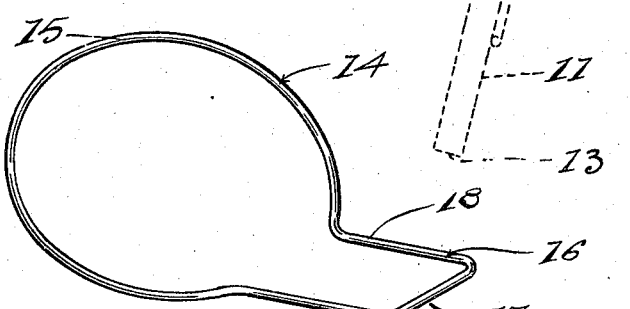
Figure 2:
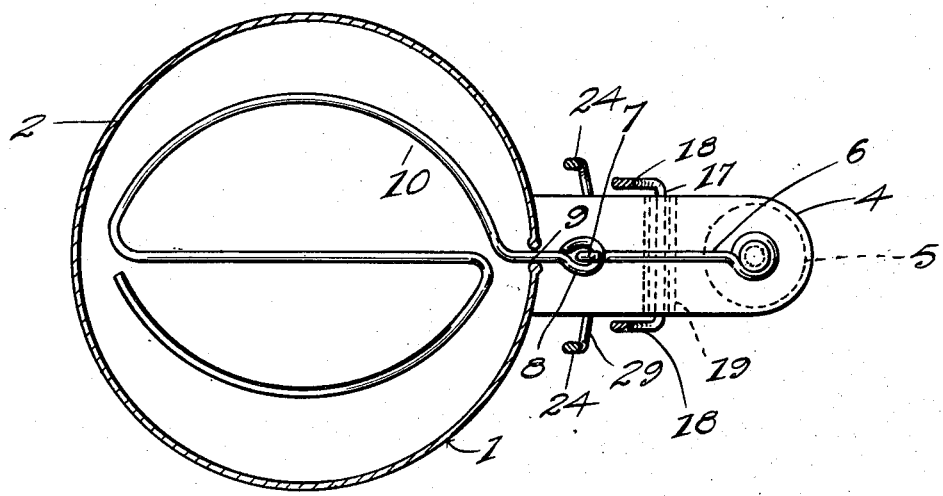
Figure 3:
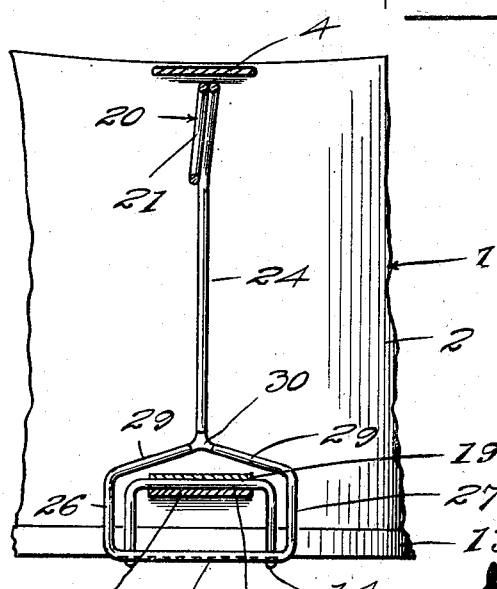

With these and other objects in view, the invention consists in the novel combination and arrangement of parts which will be fully set forth in the following specification and accompanying drawings, in which, Figure 1 is a vertical sectional view through a flour sifter constructed in accordance with this invention, Fig. 2 is a horizontal sectional view taken on line 2—2 of Fig. 1, Fig. 3 is a fragmentary sectional view taken on line 3—3 of Fig. 1, and Fig. 4 is a detail perspective view of the bottom support for the cover.

Referring now to the drawings by characters of reference, the numeral 1 designates as an entirety a flour sifter of the usual construction, comprising the cylindrical body 2 which is provided with the foraminous bottom 3. Extending outwardly from the body 2 are the brackets 4, between which the grip 5, forming the handle of the device, is pivotally mounted. The lower pivot of the grip extends through an opening in the bracket 4, and is provided with the arm 6 having the hook 7 formed at the free end thereof. This hook 7 extends through the loop 8 formed on the extension 9 which projects through an opening in the casing 2 near the foraminous bottom 3, and is formed on the agitator 10 as clearly shown in Fig. 2.

The attachment for the sifter comprises a cover, a support for the cover, and a spring for normally holding the cover in engagement with the bottom of the sifter as clearly shown in Fig. 1. The cover, above referred to, is designated by the numeral 11 and comprises the circular body 12 having formed thereon the peripheral flange 13, which flange is arranged to overlie the lower portion of the wall 2 as clearly illustrated. A suitable support, designated generally by the numeral 14, is soldered or otherwise secured to the under face of the disk 2 and comprises the wire ring 15 which is provided with the radial extension designated generally by the numeral 16. This radial extension comprises the bight portion 17 and the arms 18, the ends of which are connected to the ring as clearly shown in the drawings. This radial extension is inclined upwardly as illustrated in Figs. 1 and 3, and the bight portion 17 is pivoted in the bracket 19 carried by the supporting bracket 4, as clearly illustrated. It will thus be seen that the cover and support 14 are arranged to swing on the bight portion 17 in the bearing 19 as shown in the dotted lines in Fig. 1, to permit the contents of the sifter to pass through the foraminous bottom 3.

In order to hold the cover in place against the bottom of the sifter, there is provided the spring 20 which comprises the coil 21, having formed thereon an arm 22 which extends into the grip portion 5 and rigidly holds the spring near the upper end thereof. A suitable arm 23 is formed at the opposite terminal of the coil and the lower end of this arm terminates in the loop designated generally by the numeral 25, through which the lower bracket 4, the arm 6, and the extension 16 of the various parts of the device project. This loop 25 comprises the parallel arms 26 and 27 which are connected by the horizontally extending portion 28, and the upper ends of these arms terminate in the upwardly inclined portions 29 which are soldered or otherwise secured to the lower end of the arm 24 as at 30.

It will be apparent from the foregoing that in use the sifter is filled with flour in the usual way and transported to the place for use. Upon gripping the arm 24 of the spring 20, it will be evident that the same may be pulled rearwardly into the dotted-line position shown in Fig. 1 and will cause the loop 25 to pass rearwardly over the extension 16, thus permitting the cover to drop away from the lower edge of the body 2. Upon shaking the sifter, it will be evident that the lever 6 will cause the agitator 10 to move across the upper face of the foraminous bottom 3 and thus break the lumps which may gather in the sifter and cause the flour contained therein to be disintegrated so that it will pass through the openings of the foraminous bottom in a powdered condition. When the user desires to transport the device, the spring arm is released, and it will be evident that it will again engage the extension 16 and force the cover against the under side of the casing 2, thus avoiding any danger of the contents of the sifter being wasted.

While in the foregoing there has been shown and described the preferred embodiment of this invention, it is to be understood that such changes may be made in the combination and arrangement of parts as will fall within the spirit and scope of the invention as claimed.

What is claimed is:

1. In combination, a flour sifter including a body having a foraminous bottom, a bracket carried by the body, and an agitator within the sifter, a handle pivoted between the bracket, a spring carried by the upper end of the handle, an arm on the spring and extending downwardly therefrom, a loop at the end of the arm, a cover arranged to engage the lower edge of the body, a support for the cover, and an angular extension on the support extending through the loop on the spring and being hinged to the lowermost bracket so that when the spring is in the normal position, the loop will engage the extension and hold it against the lower edge of the body.

2. A flour sifter comprising a body, means for securing a grip to said body, a foraminous bottom for said body, an agitator pivotally mounted within the body above said bottom, a cover pivoted to the securing means for the grip above said bottom, means connected to the agitator for oscillating the agitator and means for releasably holding the cover in closed position.

3. A flour sifter comprising a body, a foraminous bottom for said body, an agitator pivotally mounted within the body above the bottom, arms on the body, a grip pivoted between the arms, a gravity opening cover pivoted to one of said arms, means on the grip for operating the agitator, and means on the grip for releasably holding the cover in its closed position.

In testimony whereof I affix my signature in presence of two witnesses.

MAE H. GEARTTS.

Witnesses:
CHAS. C. DAILY,
ALBERT J. GEARTTS.